United States Patent
Kotowski et al.

(10) Patent No.: US 7,110,493 B1
(45) Date of Patent: Sep. 19, 2006

(54) X-RAY DETECTOR SYSTEM HAVING LOW Z MATERIAL PANEL

(75) Inventors: Andreas F. Kotowski, Rancho Palos Verdes, CA (US); Steven W. Smith, Poway, CA (US)

(73) Assignee: Rapiscan Security Products (USA), Inc., Hawthorne, CA (US)

( * ) Notice: Subject to any disclaimer, the term of this patent is extended or adjusted under 35 U.S.C. 154(b) by 96 days.

(21) Appl. No.: 10/086,473

(22) Filed: Feb. 28, 2002

(51) Int. Cl.
*G01N 23/201* (2006.01)

(52) U.S. Cl. .............................. 378/87; 378/57; 378/62

(58) Field of Classification Search ................ 378/57, 378/58, 62, 86–87, 189, 198
See application file for complete search history.

(56) References Cited

U.S. PATENT DOCUMENTS

| | | | |
|---|---|---|---|
| 3,678,278 A | 7/1972 | Le Roy | 250/515.1 |
| 3,780,291 A | 12/1973 | Stein et al. | 378/146 |
| 3,790,799 A | 2/1974 | Stein et al. | 378/146 |
| 3,843,881 A | 10/1974 | Barton, Jr. et al. | 250/269 |
| 3,884,816 A | 5/1975 | Takahashi | 250/359 |
| 3,919,467 A | 11/1975 | Peugeot | 178/6.8 |
| 3,924,064 A | 12/1975 | Nomura et al. | 178/6.8 |
| 4,020,346 A | 4/1977 | Dennis | 250/358 |
| 4,031,545 A | 6/1977 | Stein et al. | 358/108 |
| 4,047,035 A | 9/1977 | Dennhoven et al. | 250/355 |
| 4,070,576 A | 1/1978 | Cobb | 250/303 |
| 4,112,301 A | 9/1978 | Annis et al. | 250/364 |
| 4,139,771 A | 2/1979 | Dennhoven et al. | 250/408 |
| 4,160,165 A | 7/1979 | McCombs et al. | 250/354 |
| 4,179,100 A | 12/1979 | Sashin et al. | 250/416 |
| 4,196,352 A | 4/1980 | Berninger et al. | 250/445 |
| 4,200,800 A | 4/1980 | Swift | 250/445 |
| 4,228,357 A | 10/1980 | Annis | 250/445 |
| 4,298,800 A | 11/1981 | Goldman | 250/445 |
| 4,303,830 A | 12/1981 | Heinzelmann et al. | 250/445 |
| 4,349,739 A | 9/1982 | Annis | 378/99 |
| 4,366,382 A | 12/1982 | Kotowski | 378/57 |
| 4,366,576 A | 12/1982 | Annis | 378/146 |
| 4,389,729 A | 6/1983 | Stein | 378/99 |
| 4,414,682 A | 11/1983 | Annis et al. | 378/146 |
| 4,422,177 A | 12/1983 | Mastronardi et al. | 378/17 |
| 4,426,721 A | 1/1984 | Wang | 378/99 |

(Continued)

OTHER PUBLICATIONS

Bossi, et al., "Backscatter X-Ray Imaging", Materials Evaluation/ 46/Oct. 1988.

(Continued)

*Primary Examiner*—Kenneth B. Wells
(74) *Attorney, Agent, or Firm*—Thelen Reid & Priest LLP; David B. Ritchie (57) ABSTRACT

A method and apparatus for detecting concealed items on or in an object by utilizing a low Z material panel. The object to be scanned is located between an x-ray detector and the low Z material panel. The method includes producing a pencil beam of x-rays from an x-ray source directed toward the object, scanning the beam of x-rays over the object, and detecting x-rays scattered from the beam of x-rays as a result of interacting with the object and the low Z material panel. The apparatus includes an x-ray source to produce a pencil beam of x-rays directed toward the object, a scanner to scan the beam of x-rays over the object, and the detector to detect x-rays scattered from the beam of x-rays as a result of interacting with the object and the low Z material panel.

42 Claims, 7 Drawing Sheets

U.S. PATENT DOCUMENTS

| | | | |
|---|---|---|---|
| 4,454,605 A | 6/1984 | DeLucia | 378/57 |
| 4,472,822 A | 9/1984 | Swift | 378/10 |
| 4,503,332 A | 3/1985 | Annis | 250/368 |
| 4,514,691 A | 4/1985 | De Los Santos et al. | 324/301 |
| 4,535,245 A | 8/1985 | Zonneveld et al. | 250/385 |
| 4,736,401 A | 4/1988 | Donges et al. | 378/146 |
| 4,756,015 A | 7/1988 | Doenges et al. | 378/57 |
| 4,759,047 A | 7/1988 | Donges et al. | 378/57 |
| 4,768,214 A | 8/1988 | Bjorkholm | 378/87 |
| 4,783,794 A | 11/1988 | Dietrich | 378/57 |
| 4,799,247 A | 1/1989 | Annis et al. | 378/87 |
| 4,809,312 A | 2/1989 | Annis | 378/146 |
| 4,817,121 A | 3/1989 | Shimizu et al. | 378/57 |
| 4,819,256 A | 4/1989 | Annis et al. | 378/87 |
| 4,825,454 A | 4/1989 | Annis et al. | 378/87 |
| 4,839,913 A | 6/1989 | Annis et al. | 378/44 |
| 4,845,769 A | 7/1989 | Burstein et al. | 378/58 |
| 4,893,015 A | 1/1990 | Kubierschky et al. | 250/369 |
| 4,974,247 A | 11/1990 | Friddell | 378/90 |
| 5,022,062 A | 6/1991 | Annis | 378/6 |
| 5,033,073 A | 7/1991 | Friddell | 378/146 |
| 5,044,002 A | 8/1991 | Stein | 378/54 |
| 5,084,619 A | 1/1992 | Pfeiler et al. | 250/327.2 |
| 5,127,030 A | 6/1992 | Annis et al. | 378/150 |
| 5,132,995 A | 7/1992 | Stein | 378/56 |
| 5,156,270 A | 10/1992 | Kachel et al. | 206/451 |
| 5,179,581 A | 1/1993 | Annis | 378/57 |
| 5,181,234 A | 1/1993 | Smith | 378/87 |
| 5,224,144 A | 6/1993 | Annis | 378/146 |
| 5,247,561 A | 9/1993 | Kotowski | 378/87 |
| 5,253,283 A | 10/1993 | Annis et al. | 378/100 |
| 5,260,982 A * | 11/1993 | Fujii et al. | 378/87 |
| 5,313,511 A * | 5/1994 | Annis et al. | 378/87 |
| 5,600,700 A | 2/1997 | Krug et al. | 378/57 |
| 5,642,394 A * | 6/1997 | Rothschild | 378/57 |
| 5,699,400 A | 12/1997 | Lee et al. | 378/57 |
| 5,764,683 A | 6/1998 | Swift et al. | 378/57 |
| 5,966,422 A | 10/1999 | Dafni et al. | 378/9 |
| 5,974,111 A | 10/1999 | Krug et al. | 378/57 |
| 6,018,562 A | 1/2000 | Willson | 378/9 |
| 6,094,472 A | 7/2000 | Smith | 378/86 |
| 6,269,142 B1 * | 7/2001 | Smith | 378/57 |
| 6,370,222 B1 * | 4/2002 | Cornick, Jr. | 378/57 |

OTHER PUBLICATIONS

Gregory, William, "Medical X-Ray Measuring Device Finds Use in Explosive Detection", Aviation Week & Space Technology, vol. 124, No. 17, Apr. 28, 1986.

Gustafsson, et al., "X-Ray Spectrophotometry for Bone-Mineral Determinations", Medical and Biological Engineering; pp. 113-118, Jan. 1974.

PerkinElmer Instruments, "Z-Scan7", printed from http://instruments.perkinelmer.com/products/_catalog/products/prod81.asp (2000).

"New X-Ray System Exposes Unseen Threats", Security World, May 1986.

Stein, et al., "Flying Spot X-ray Imaging Systems", American Science & Engineering, Inc., pp. 137-142, 1972.

Towe, et al., "X-Ray Compton Scatter Imaging Using a High Speed Flying Spot X-Ray Tube" IEEE Transactions on Biomedical Engineering, vol. BME-28, No. 10 Oct. 1981.

\* cited by examiner

X-RAY DETECTOR SYSTEM HAVING LOW Z MATERIAL PANEL

FIELD OF THE INVENTION

The present invention relates to the general field of radiant energy imaging systems, and specifically to systems and techniques for detecting concealed items on or in objects.

BACKGROUND OF THE INVENTION

Security systems are limited in their ability to detect contraband, weapons, explosives, and other dangerous objects concealed under a person's clothing or in an object, such as a box or bag. Metal detectors and chemical sniffers are commonly used for the detection of large metal objects and some kinds of explosives, however, a wide range of dangerous objects exist that cannot be detected with these devices. Plastic and ceramic weapons developed by modern technology increase the types of non-metallic objects that security personnel are required to detect. The alternative of manual searching of subjects is slow, inconvenient, and would not be well tolerated by the general public, especially as a standard procedure in, for example, airports.

Radiation exposure is an important consideration in x-ray concealed object detection systems. The United States National Council on Radiation Protection (NCRP), in NCRP Report No. 91, "Recommendations on Limits for Exposure to Ionizing Radiation", 1987, addresses this issue. In this report, the NCRP states that a radiation exposure of less than 1000 microRem per year in excess of environmental levels is negligible, and efforts are not warranted at reducing the level further. Persons employed in high security or secured facilities, or those who frequently travel by airlines, may be subjected to many hundred security examinations per year. A yearly radiation exposure limit of 1000 microRem safely permits a single scan exposure within the range of 1 to 10 microRem for the general public. In accordance with the NCRP recommendations, radiation levels significantly higher than this may present some health risk.

Known prior art x-ray systems have limitations in their design and method which prohibit them from achieving the low dose and high image quality that are prerequisites to commercial acceptance. For example, radiant energy imaging systems that detect concealed objects carried on or in an object often scan pencil beam of x-rays through the object where the beam is transmitted or absorbed depending upon the concealed object, if any. A detector may be scanned vertically behind the object in step with the pencil beam to collect the transmitted x-rays.

Figure 1:
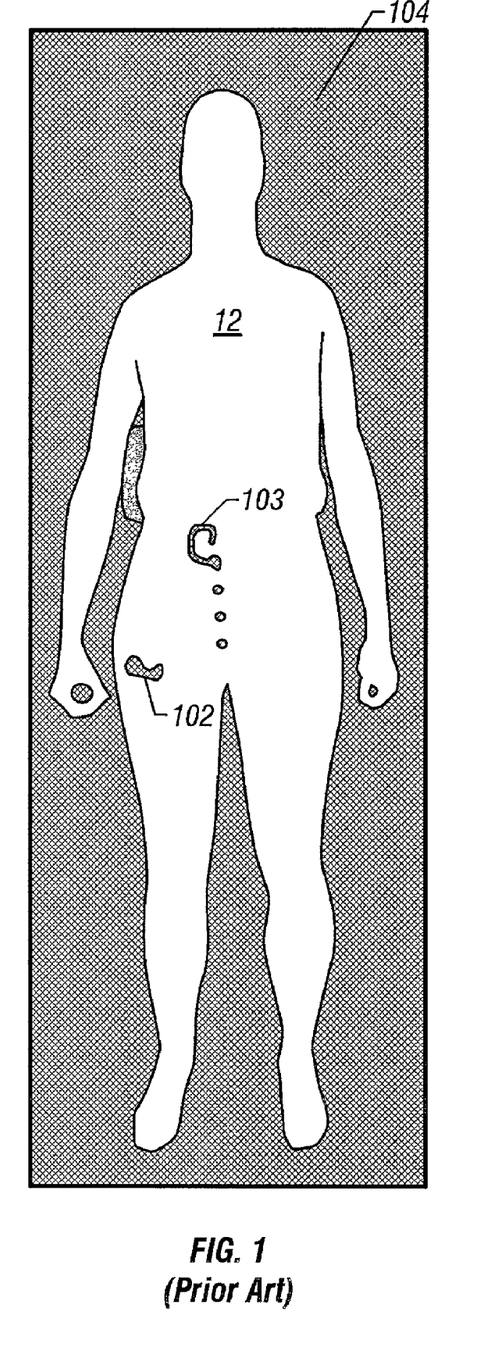
FIG. 1 is a scan image created by an x-ray imaging system in accordance with the prior art.

U.S. Pat. No. 5,181,234 (the '234 patent), herein incorporated by reference as if set forth fully herein, discloses an imaging system which does not require x-rays to be scanned through the object. The '234 patent discloses an imaging apparatus where a narrow pencil beam of x-ray radiation is scanned over the object whereby x-rays that strike low atomic number materials, such as soft tissue, are scattered (i.e. reflected) back toward the apparatus. In comparison, x-rays that strike metal are mostly absorbed and generate very little scatter. Moreover, x-rays that do not strike the object are not captured or scattered back toward the apparatus since the x-rays continue until absorbed or scattered by items further behind the object. Detectors within the apparatus capture the scattered x-rays and generate a corresponding image. For example, as shown in FIG. 1, the vast majority of the body 12 appears light, as a result of the soft tissue generating significant back scatter of x-rays. Metals such as coins in the pocket 102 and belt buckle 103 appear dark due to their absorption of the x-rays. The background 104 around the body is also dark since there is nothing to scatter the x-rays back to the detector.

Figure 2:
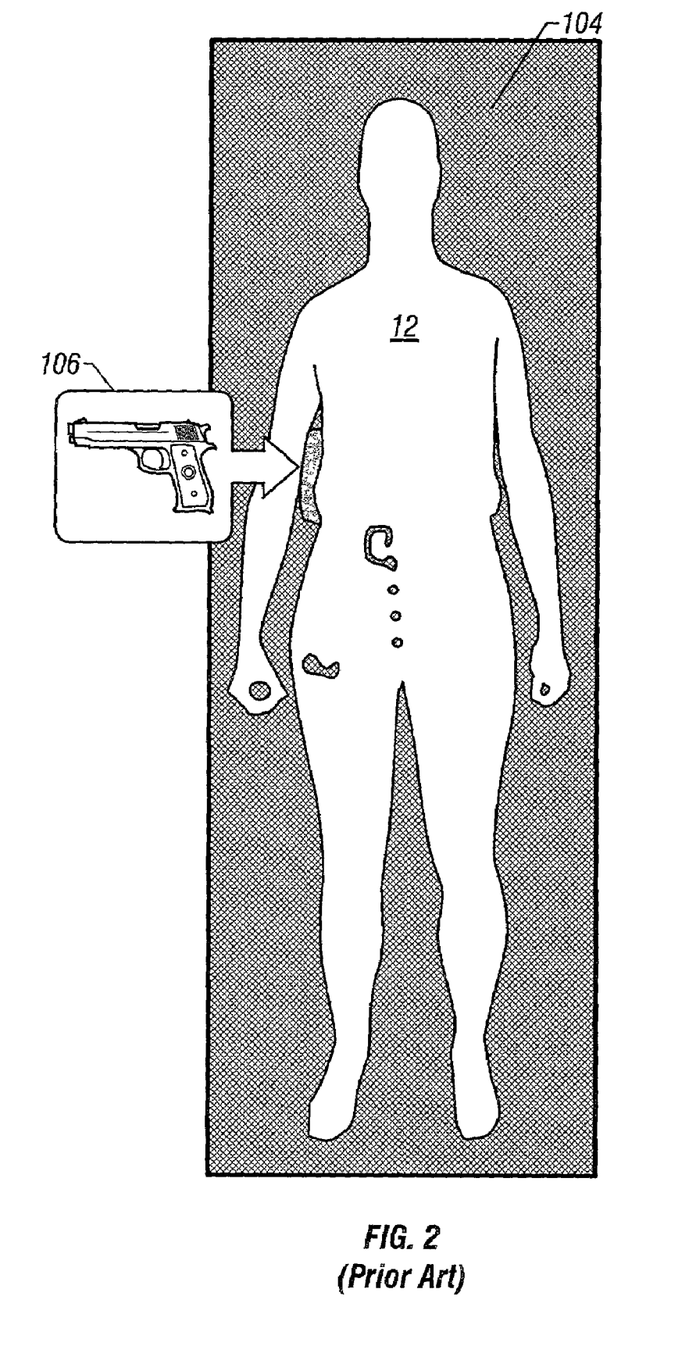
FIG. 2 is a scan image illustrating potential disadvantages of imaging systems in accordance with the prior art.

As shown in FIG. 2, a potential disadvantage of this approach is the difficulty in detecting metal objects that appear in front of or against the background 104 and not in front of the body 12. FIG. 2 shows a metal handgun 106 concealed under the subject's 12 arm. The handgun 106 is virtually impossible to detect in this view since both the handgun 106 and the background 104 appear dark. People may also hang or wear contraband on their sleeves or pant legs, which would be difficult to detect since it would be against the background and appear dark.

Another potential disadvantage of the prior art is that it provides no mechanism to control the x-rays not scattered or absorbed by the object. Currently, the x-rays not scattered or absorbed by the object continue until absorbed or scattered by other items beyond the object. Thus, no objects or persons should be within six to fifteen feet of the apparatus otherwise the person or object will be unnecessarily exposed to the x-rays and may even appear in the image.

Thus, there is a need for an apparatus that would overcome the disadvantages of prior art x-ray systems and allow for the detection of concealed objects in the same plane as the background. There is also a need for a way to control x-rays that are not scattered or absorbed by the object to protect other persons from unnecessary exposure to the x-rays and to prevent image degradation.

BRIEF DESCRIPTION OF THE INVENTION

The present invention provides for a method and apparatus to detect concealed items on or in an object by producing a pencil beam of x-rays from an x-ray source directed toward said object, scanning the beam of x-rays over the object, and detecting x-rays scattered from the beam of x-rays as a result of interacting with the object and a low Z material panel, the object located between the detector and the panel. The apparatus provides for an x-ray source to produce a pencil beam of x-rays directed toward an object, a scanner to scan the beam of x-rays over the object, and a detector to detect x-rays scattered from the beam of x-rays as a result of interacting with the object and the low Z material panel, the object located between the detector and the panel.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a x-ray detector system. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 3:
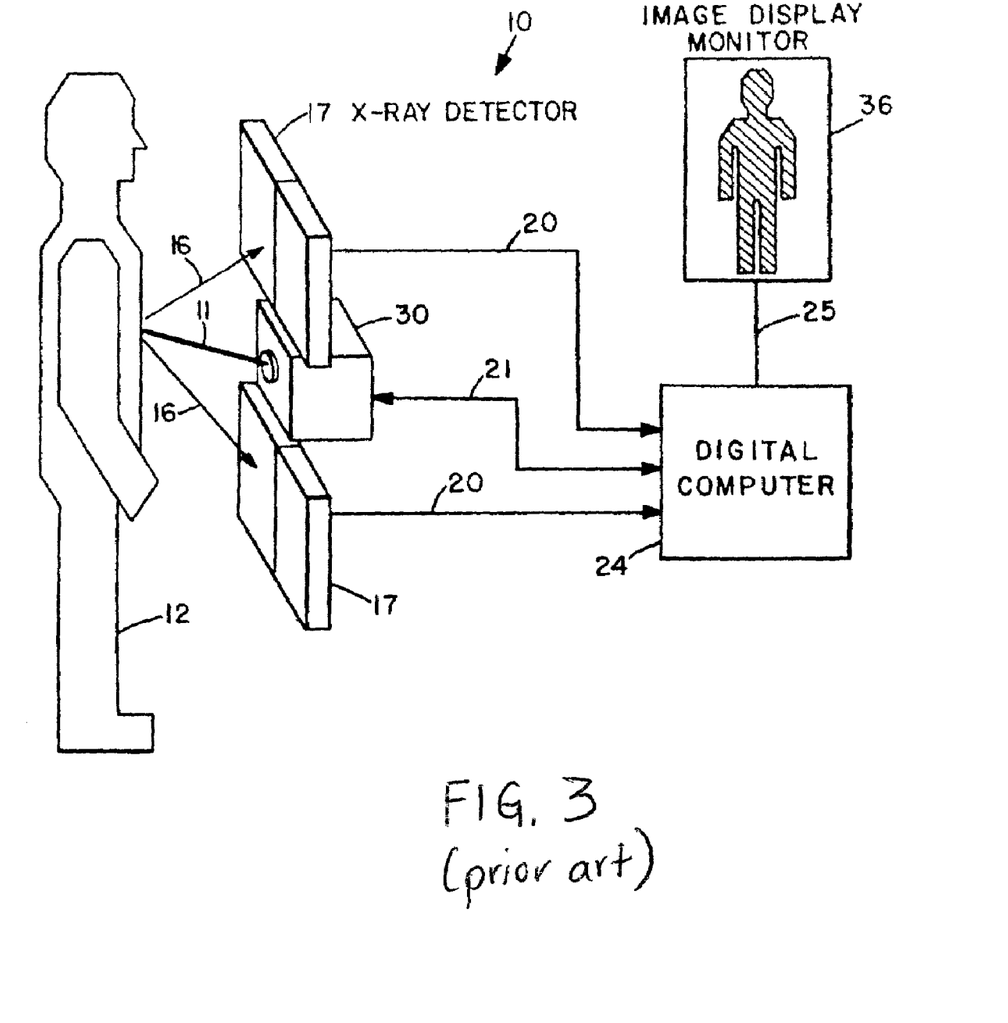
FIG. 3 is a diagrammatic view of an imaging system in accordance with the prior art.

One embodiment of the present invention will be described with reference to the imaging system of the '234 patent. However, those of ordinary skill in the art will now realize that the present invention may be used with other imaging systems known in the art. FIG. 3 shows the imaging system 10 scanning a pencil beam 11 of x-rays over the surface of the body 12 of the person being examined. X-rays 16 scattered or reflected from the body 12 are detected by x-ray sensitive detectors 17. The detectors 17 are positioned for substantially uniform x-ray detection on all sides of the incident x-ray beam. The electronic signals 20 produced from the detectors 17 and synchronization signals 21 from the x-ray source 30 are routed into the digital computer 24. The computer 24 generates an image display 25 on a monitor (screen) 36 wherein the intensity at each point in the display corresponds to the relative intensity of the detected scattered x-rays.

As described in detail in the '234 patent, x-rays interact with matter in two ways: Compton scattering and the photoelectric effect. An x-ray interacting by Compton scattering is deflected out of the original x-ray beam creating back scattered radiation. The photoelectric effect, in comparison, absorbs x-rays and thus reduces the level of back scatter. At low atomic numbers and high energies, Compton scattering is more likely to occur than the photoelectric effect. This gives rise to a large amount of scatter and the relatively high reflectance. At higher atomic numbers and lower x-ray energies, the photoelectric effect absorbs more of the x-rays resulting in less scatter and the low reflectance.

In one embodiment, the X-ray tube operates in the range of 35 to 70 Kilovolts with a pixel size of 12 to 120 square millimeters. The backscatter X-ray detector 17 comprises an X-ray sensitive area of 150 to 1500 square inches and is positioned 5 to 15 inches from the body of the person being examined. In another embodiment, the backscatter detector may be positioned farther from the person being examined with a corresponding increase in detector area. It has been empirically determined that these parameters are approximately optimized at the values of 50 Kilovolts, 40 square millimeters pixel area, 952 square inches X-ray sensitive area, and an 8 inch subject-to-detector distance. These technique factors simultaneously provide a CV (coefficient of variation in the range of 2 to 10 percent and X-ray dose in the range of 1 to 5 microRem.

In another embodiment, the X-ray source is composed of an X-ray tube operating at 50 Kilovolts and 5 milliamps, with an inherent filtration equivalent to 1 millimeter aluminum. The X-ray source itself is located approximately 30 inches from the person being examined. Standard references, for example: "Catalogue of Spectral Data for Diagnostic X-rays" by Birch, Marshall and Ardran, Published by The Hospital Physicists' Association, London, 1979.", provide data on X-ray tube output. From this reference, under the conditions created according to the arrangement of the inventors, the subject receives a radiation dose of approximately three (3) microRem with a corresponding X-ray photon flux of about 11,500 X-rays in each pixel. Each of these 11,500 X-rays per pixel will either (1) pass through the body unaffected, (2) be absorbed in the body by the photoelectric effect, or (3) exit the body by Compton scattering.

The image noise in a well designed X-ray imaging system is determined by Poisson statistics based on the average number of X-rays detected in each image pixel. This results in the coefficient of variation (CV), or the relative image noise, being inversely proportional to the square root of the number of detected X-rays:

$$CV = N^{-1/2} \times 100\%$$

where CV is the coefficient of variation between pixels and N is the average number of X-rays detected per pixel. This can be most easily calculated for a specific image by, for example, localizing several hundred adjacent image pixels located in an anatomically flat area near the center of the subject's body. The mean and standard deviation are calculated by standard statistical methods. The image CV is then 100% times the standard deviation divided by the mean.

Figure 7:
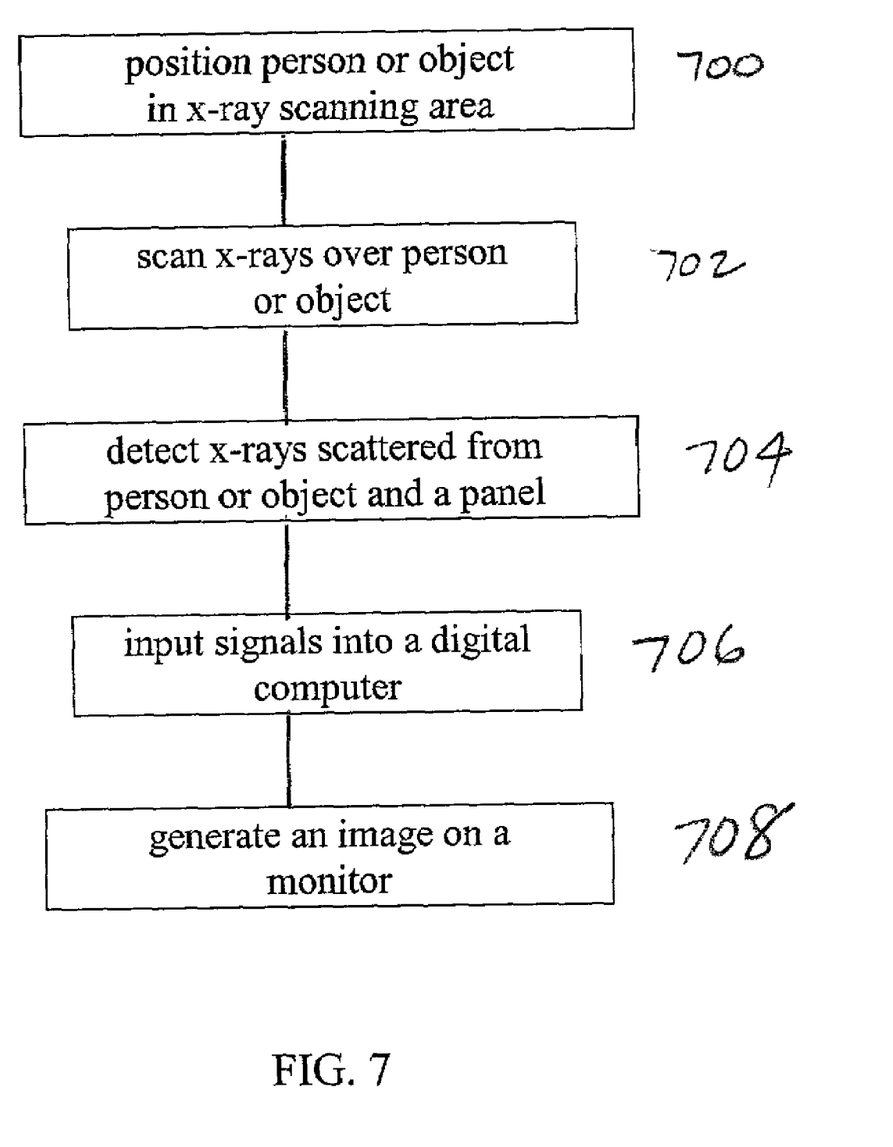
FIG. 7 is a flow diagram illustrating a method in accordance with the present invention.

The optimum dose of 1 to 10 microRem is determined as the range that satisfies each of the conflicting requirements of image quality and health risk. (As previously discussed, higher radiation doses pose a non-trivial health risk to persons being exposed. Radiation doses lower than this range are unnecessarily conservative for health protection and provide unacceptably poor image quality.) Based on this optimum subject radiation dose the optimum X-ray flux and size of the scanning X-ray beam can be derived. As can be seen in FIG. 7, the difference in X-ray reflections between carbon (Z=6) and oxygen (Z=8) is about 30 percent at the optimum X-ray energy of 30 Kev. It has been empirically determined that in order to detect explosives and other dangerous objects, the acquired image must be able to resolve reflectance differences of a few percent. As discussed later, it has been empirically determined that the CV must be in the range of 2 to 10 percent. This, in turn, requires approximately 11,500 X-rays to strike each pixel on the subject being examined, as shown by the following analysis. It has been empirically determined that the preferred embodiment detector area of 952 square inches placed 8 inches from the subject will receive a backscatter of approximately 7% of these 11,500 X-rays, i.e. approximately 800 X-rays per pixel. Detective quantum efficiency of 50% will result in about 400 of the 800 X-rays contributing to the detector output signal. As the previously presented equation (2) shows, 400 X-rays detected in each pixel will result in a coefficient of variation of 5 percent, within the required range for a acceptable image quality and detection capability.

Prior art systems are designed and optimized to operate by detecting X-rays that have been transmitted through the body. Even at high X-ray tube potentials, a very low percentage of X-rays can penetrate through the body. Data on X-ray penetration can be readily found in the literature, for example the previously referenced "Catalogue of Spectral Data . . . " Data from this reference shows that at 140 KV only about 1.4 percent of incident X-rays penetrate through an average person's body thickness of 20 centimeters and are detectable to form an image. Only about 0.19 percent of incident X-rays penetrate through a large person's body thickness of 30 centimeters, and are detectable to form an image. In marked improvement over the prior art, the present invention enables seven percent (7%) of the X-rays to be detected. The greatly increased X-ray flux utilization of the present invention backscatter geometry can therefore be seen to provide a reduction of a factor of five to thirty-five in the required radiation dose compared to prior art X-ray transmission type systems, for equal numbers of detected X-rays.

The X-ray potential in prior art systems is selected to optimize the image quality for transmission radiography. This requires high energy X-rays to achieve sufficient penetration through the body, and thus achieve a larger number of detected X-rays. For example the system disclosed in U.S. Pat. Re. No. 28,444 operates with a peak voltage of 150 Kilovolts. From the above referenced "Catalog of Spectral Data . . . ", (extrapolating form FIG. 9) this potential produces X-rays with an average energy of approximately sixty (60) Kiloelectron-volts (Kev). The present invention can operate with an empirically and theoretically determined optimum X-ray tube potential of 50 Kilovolts, resulting in X-rays of approximately thirty (30) KeV.

Standard references can be used to obtain the values for the X-ray interaction with matter at these energies, for example, "Radiation Detection" by Tait, published by The Butterworth Group, London, 1979. The attenuation coefficients of carbon and oxygen can be used to show characteristics of the two energies. At 60 KeV, the attenuation coefficients of carbon and oxygen, are 0.1765 and 0.1945 grams per centimeter squared, respectively, or a difference of about ten percent. At 30 Kev, the attenuation coefficients are 0.2520 and 0.3733, respectively, a difference of forty-eight percent (48%). This difference in X-ray attenuation results in a backscatter image contrast at 30 Kev being approximately a factor of five (5) greater than at 60 Kev. It is known that the dose required to produce an image is inversely proportional to the square of the contrast, for example, see "Basic Concepts of Digital Substraction Angiography" by Kruger and Riederer, published by Hall Medical Publishers, Boston, pg 79. Thus, the X-ray energy selection of the present invention provides higher contrast images allowing the use of approximately a factor of twenty-five (25) times lower radiation dose than prior art systems.

Figure 4:
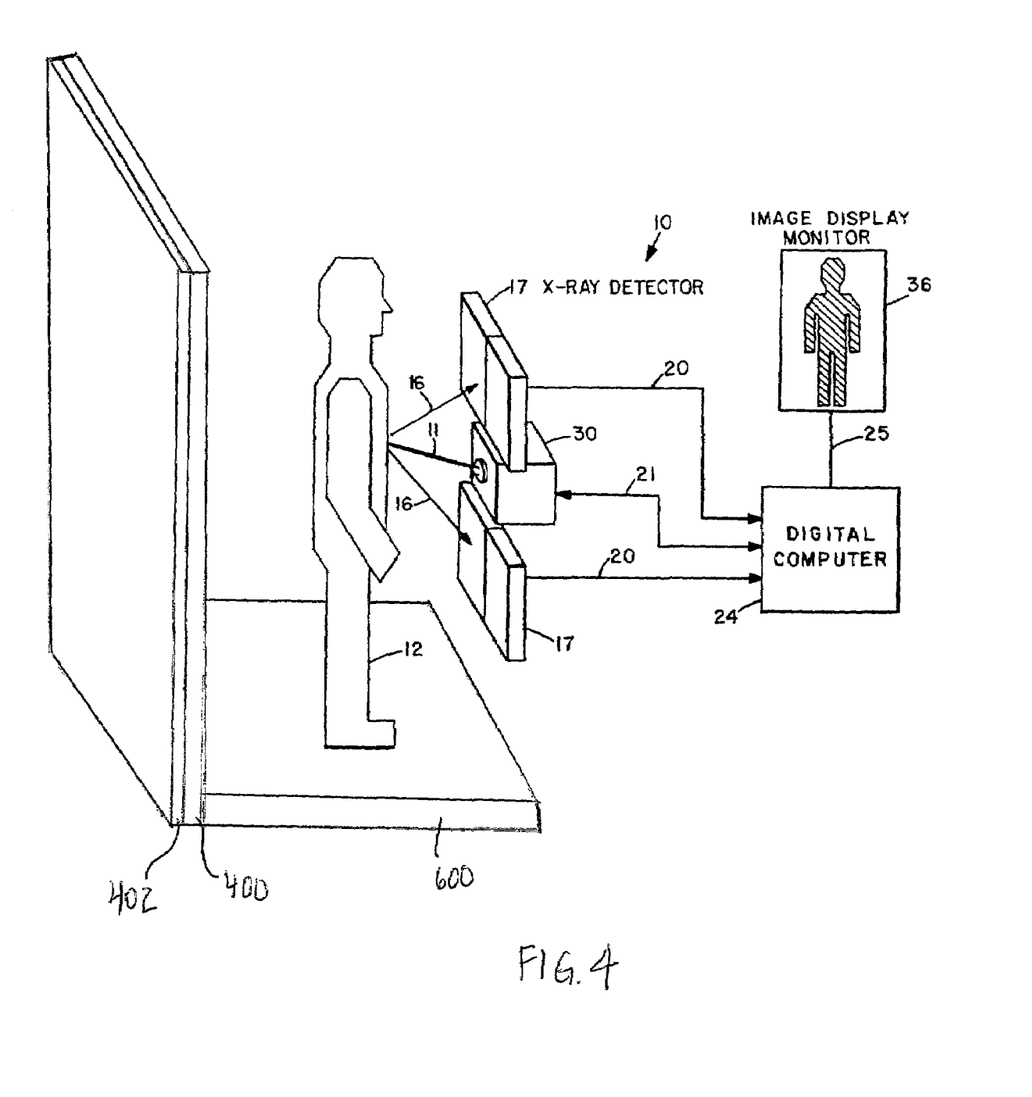
FIG. 4 is a diagrammatic view of an x-ray scanning system in accordance with the present invention.

As shown in FIGS. 1 and 3, x-rays not scattered by the body 12 or object continue past the body 12 and are not scattered back to the detector 17 thereby creating a dark colored background 104. To overcome the disadvantages of having the dark background 104, a panel 400 is placed behind the object 12 as shown in FIG. 4. The panel 400 is preferably comprised of a low atomic number ("Z") material or materials with effective atomic numbers less than about 8, so that x-rays striking the panel 400 will be scattered back to the detector 17. Materials having a low effective atomic number relates to the average atomic number of a mixture of elements. For example, water has an effective atomic number of approximately 7.5 having hydrogen with an atomic number of 1 and oxygen with an atomic number of 8 (with oxygen being more important since it is heavier). Examples of low effective atomic number materials are epoxy, wood, masonite, water, and plastic materials such as polyethylene and acrylic. The panel 400 is preferably approximately one inch thick, but may be between one-half inch to two inches in thickness, and have a height of seven feet, but may have a height of between six to twelve feet. Those of ordinary skill in the art will now realize that other dimensions may be used depending upon the application. The panel 400 may be between two to six feet from the detector 17, but is preferably about three feet from the detector 17. For non-human scanning applications other distances may be used as appropriate. The panel 400, located further from the detector 17 than the object 12, creates a continuous level of scattered x-rays having a generally different intensity than x-rays scattered from the object 12. Thus, when used with existing scanners in accordance with the printout, the panel produces a gray colored background in the image rather than a dark colored background 104 or a light color similar to the body 12.

Figure 5:
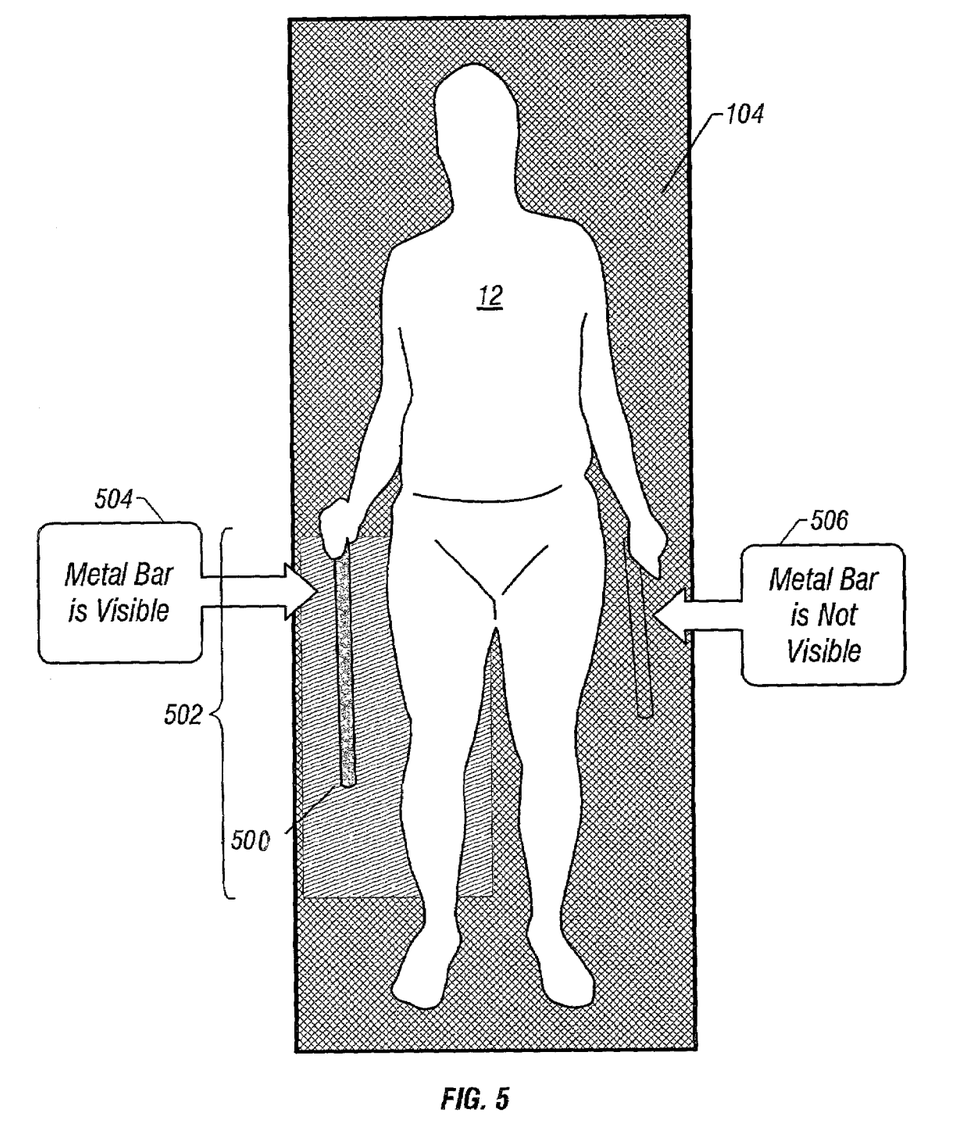
FIG. 5 is a scan image created in accordance with one embodiment of the present invention.

FIG. 5 is an example showing the difference between having a panel and not having a panel behind an object. A one inch thick sheet of acrylic 500 was placed behind the body 12 on the lower left one-quarter 502 of the image. Moreover, the person 12 was instructed to hold two one inch diameter by twenty-four inch long metal pipes 504 and 506, one in each hand. As can be seen in FIG. 5, the left quarter image background 502, where the panel 500 is located, is brighter than the background 104 but darker than the body 12. Moreover, the metal pipe 504 on the left side is visible against the gray background whereas the pipe 506 on the right side is not visible against the black background 104. The panel 500 creates a gray background due to the x-rays that are scattered from the panel 500, the shade of gray being brighter than the black background 104 due to the scatter of x-rays but darker then the body 12 since the panel 500 is farther away from the detector than the body 12 thereby scattering x-rays with less intensity.

Figure 6:
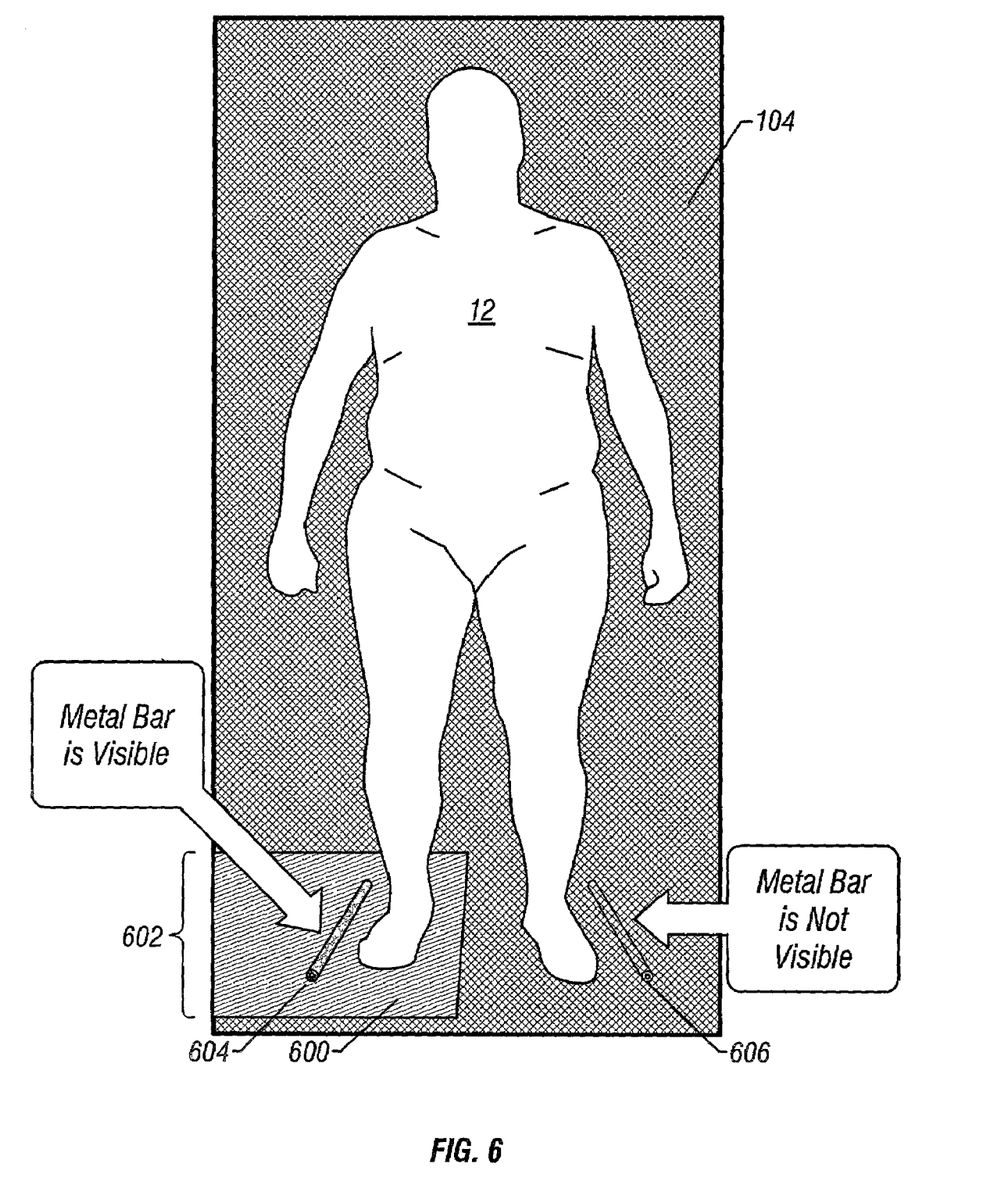
FIG. 6 is a scan image created in accordance with another embodiment of the present invention.

FIG. 6 is another illustration showing the difference between having a panel and not having a panel behind an object. However, FIG. 6 also shows an embodiment having the panel 600 located on the bottom of the object 12. In FIG. 6, a one inch thick sheet of acrylic was placed under the feet of the body 12 on the lower left one-half 602 of the image. Moreover, two one inch diameter by twenty-four inch long metal pipes 604 and 606 were placed on the floor, one by each foot. As can be seen in FIG. 6, the left half of the image 602, where the panel 600 is located, is brighter than the background 104 but darker than the body 12. Thus, the metal pipe 604 on the left side is visible whereas the pipe 606 on the right side is not visible.

It will now be understood by those of ordinary skill in the art that the panel may be placed in different alternative positions. As shown in FIGS. 4 and 6, a floor panel 600 may be placed underneath the person 12 or object being scanned to detect, for example, objects in the shoes or on the legs or feet of the person being scanned. In another alternative embodiment, the panel may also extend outwardly from the sides and the top. Those of ordinary skill in the art will now realize that the panel may be formed of any shape such as a square, semi-circle, or any other shape around the person or object scanned.

As shown in FIG. 4, the present invention may also have a radiation shield 402 coupled to the panel 400 to capture any x-rays 11 that may pass through the panel 400, 600. This will ensure that any person behind the panel 400 will not be inadvertently exposed to x-rays. Moreover, the radiation shield 402 will ensure that objects behind the panel 400 will not be reproduced in the image 36. The radiation shield 402 may be made of any x-ray absorbing material such as steel or lead and be a few percent of the thickness of the panel 400.

The present invention also provides for a method for detecting concealed items on or in an object as shown in FIG. 7. An object or body is positioned in the x-ray scanning area 700 and a pencil beam of x-rays is scanned over the surface of the body or object 702 being examined. X-rays scattered or reflected from the body and a panel are detected 704 by x-ray sensitive detectors. The detectors are positioned for substantially uniform x-ray detection on all sides of the incident x-ray beam. The electronic signals produced from the detectors and synchronization signals from the x-ray source are inputted into the digital computer 706. The computer generates an image display on a monitor (screen) 708 wherein the intensity at each point in the display corresponds to the relative intensity of the detected scattered x-rays.

The panel is preferably made of a low Z material or materials with effective atomic numbers less than about 8, so that x-rays striking the panel will be scattered back to the detector. Materials having a low effective atomic number relates to the average atomic number of a mixture of elements. For example, water has an effective atomic number of approximately 7.5 having hydrogen with an atomic number of 1 and oxygen with an atomic number of 8 (with oxygen being more important since it is heavier). Thus, examples of low effective atomic number materials are epoxy, wood, masonite, water, and plastic materials such as polyethylene and acrylic. The panel is preferably one inch thick, but may be between one-half inch to two inches in thickness, and have a height of seven feet, but may have a height of between six to twelve feet. The panel may be between two to six feet from the detector, but is preferably three feet from the detector. Those of ordinary skill in the art will no realize that other dimensions may be used depending upon the application. Moreover, for non-human scanning applications, other distances may be used as appropriate. The panel, located further from the detector than the object, creates a continuous level of scattered x-rays having a generally different intensity than x-rays scattered from the object. Thus, when used with existing scanners in accordance with the prior art, the panel produces a gray background in the image rather than a dark background or a light shade of gray similar to the body.

It will now be understood to those of ordinary skill in the art that the panel may be placed in different alternative positions. As shown in FIG. 6, a floor panel may be placed underneath the person or object being scanned to detect, for example, objects in the shoes or on the legs or feet of the person being scanned. In another alternative embodiment, the panel may also extend outwardly from the sides and the top such that the object or person being scanned is secured in an enclosure. Those of ordinary skill in the art will now realize that the panel may be formed of any shape such as a square, semi-circle, or any other shape around the person or object that is to be scanned.

A radiation shield may be coupled to the panel to capture any x-rays that may pass through the panel. This will ensure that any person behind the panel will not be inadvertently exposed to x-rays. Moreover, the radiation shield will ensure that objects behind the panel will not be reproduced in the image. The radiation shield may be made of any x-ray absorbing material such as steel or lead and be a few percent of the thickness of the panel.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for detecting concealed items on or in an object, the method comprising:
    producing a pencil beam of x-rays from an x-ray source directed toward said object;
    scanning said beam of x-rays over the surface of said object; and
    detecting x-rays scattered from said beam of x-rays as a result of interacting with said object and a low Z material panel, said object located between said detector and said panel, said detecting comprising differentiating x-rays back scattered by the object from those back scattered by the low Z material panel,
    wherein said pencil beam of x-rays exposes said object to an x-ray dose in the range of about 1 microRem to about 10 microRem.

2. The method of claim 1 further comprising generating a signal representative of the intensity of the x-rays scattered.

3. The method of claim 2 further comprising presenting said signal on a display.

4. The method of claim 1 wherein said low Z material panel is made polyethylene.

5. The method of claim 1 wherein said low Z material panel is made of epoxy.

6. The method of claim 1 wherein said low Z material panel is made of water.

7. The method of claim 1 further comprising a radiation shield coupled to said low Z material panel, said low Z material panel located between said object and said radiation shield.

8. The method of claim 7 wherein said radiation shield comprises an x-ray absorbing material.

9. The method of claim 8 wherein said x-ray absorbing material is steel.

10. The method of claim 8 wherein said x-ray absorbing material is lead.

11. The method of claim 7 wherein said radiation shield is about 1 mm thick.

12. The method of claim 1 wherein said low Z material panel is located above said object.

13. The method of claim 1 wherein said low Z material panel is located below said object.

14. A program storage device readable by a machine, tangibly embodying a program of instructions executable by the machine to perform a method for detecting concealed items on or in an object, said method comprising:

producing a pencil beam of x-rays from an x-ray source directed toward said object;

scanning said beam of x-rays over the surface of said object; and detecting x-rays scattered from said beam of x-rays as a result of interacting with said object and a low Z material panel, said object located between said detector and said panel, said detecting comprising differentiating x-rays back scattered by the object from those back scattered by the low Z material panel, wherein said pencil beam of x-rays exposes said object to an x-ray dose in the range of about 1 microRem to about 10 microRem.

15. An apparatus to detect concealed items on or in an object, the apparatus comprising:

an x-ray source to produce a pencil beam of x-rays directed toward said object;

a scanner to scan said beam of x-rays over the surface of said object; and a detector to detect x-rays scattered from said beam of x-rays as a result of interacting with said object and a low Z material panel, said object located between said detector and said panel, said detector differentiating x-rays back scattered by the object from those back scattered by the low Z material panel, wherein said pencil beam of x-rays exposes said object to an x-ray dose in the range of about 1 microRem to about 10 microRem.

16. The apparatus of claim 15 further comprising a processor to generate a signal representative of the intensity of the x-rays scattered.

17. The apparatus of claim 16 further comprising a display to display said signal.

18. The apparatus of claim 15 wherein said low Z material panel is made polyethylene.

19. The apparatus of claim 15 wherein said low Z material panel is made of epoxy.

20. The apparatus of claim 15 wherein said low Z material panel is made of water.

21. The apparatus of claim 15 further comprising a radiation shield coupled to said low Z material panel, said low Z material panel located between said object and said radiation shield.

22. The apparatus of claim 21 wherein said radiation shield comprises an x-ray absorbing material.

23. The apparatus of claim 22 wherein said x-ray absorbing material is steel.

24. The apparatus of claim 22 wherein said x-ray absorbing material is lead.

25. The apparatus of claim 21 wherein said radiation shield is about 1 mm thick.

26. The apparatus of claim 15 wherein said low Z material panel is located above said object.

27. The apparatus of claim 15 wherein said low Z material panel is located below said object.

28. The method of claim 1, wherein said pencil beam of x-rays exposes said object to an x-ray dose in the range of about 1 microRem to about 5 microRem.

29. The method of claim 1, wherein said pencil beam of x-rays exposes said object to an x-ray dose of about 3 microRem.

30. The method of claim 1, further comprising using said detected x-rays to generate an image having a coefficient of variation (CV) in the range of about 2 to about 10 percent.

31. The method of claim 28, further comprising using said detected x-rays to generate an image having a coefficient of variation (CV) in the range of about 2 to about 10 percent.

32. The method of claim 1, wherein said pencil beam of x-rays is generated by an x-ray tube operating at about 50 KV and 5 mA.

33. The device of claim 14, wherein said pencil beam of x-rays exposes said object to an x-ray dose in the range of about 1 microRem to about 5 microRem.

34. The device of claim 14, wherein said pencil beam of x-rays exposes said object to an x-ray dose of about 3 microRem.

35. The device of claim 14, further comprising an imaging system adapted to use said detected x-rays to generate an image having a coefficient of variation (CV) in the range of about 2 to about 10 percent.

36. The device of claim 33, further comprising an imaging system adapted to use said detected x-rays to generate an image having a coefficient of variation (CV) in the range of about 2 to about 10 percent.

37. The device of claim 14, wherein said pencil beam of x-rays is generated by an x-ray tube operating at about 50 KV and 5 mA.

38. The apparatus of claim 15, wherein said pencil beam of x-rays exposes said object to an x-ray dose in the range of about 1 microRem to about 5 microRem.

39. The apparatus of claim 15, wherein said pencil beam of x-rays exposes said object to an x-ray dose of about 3 microRem.

40. The apparatus of claim 15, further comprising an imaging system adapted to use said detected x-rays to generate an image having a coefficient of variation (CV) in the range of about 2 to about 10 percent.

41. The device of claim 38, further comprising an imaging system adapted to use said detected x-rays to generate an image having a coefficient of variation (CV) in the range of about 2 to about 10 percent.

42. The device of claim 14, wherein said pencil beam of x-rays is generated by an x-ray tube operating at about 50 KV and 5 mA.

* * * * *